Sept. 14, 1937.  G. A. DUPUIS  2,092,960

LICENSE PLATE STRUCTURE

Filed April 30, 1936

INVENTOR.
George A. Dupuis
BY Parker & Burton
ATTORNEY.

Patented Sept. 14, 1937

2,092,960

UNITED STATES PATENT OFFICE 2,092,960

LICENSE PLATE STRUCTURE

George A. Dupuis, St. Clair Shores, Mich.

Application April 30, 1936, Serial No. 77,166

3 Claims. (Cl. 116—32)

This invention relates to an improved license plate structure for vehicles.

An object is to provide an official license plate as exemplified in an automobile license plate, which is so constructed and so supported upon the vehicle as to be breakable or destructible upon impact such as would result from the striking of another object by the vehicle equipped with such plate whether such other object were an automobile or person.

My improved license plate structure might be termed an accident recording license plate. It is formed of frangible material relatively easily breakable upon impact but sufficiently strong to stand up under the shock and jar incident to normal road travel of the car but an impact, even an impact resulting from the striking of an animal, is sufficient to cause breakage of the plate.

An object of the invention is the provision of a license plate so formed and so disposed at the front end of the car, slightly rearwardly of the front bumper that impact of such end of the car against another object will result in breakage of the plate necessitating its replacement.

A meritorious feature is that the plate includes as an integral part thereof frangible end extensions which overlap the front fenders so that impact of any portion of the front end of the car sufficient to result in injury to the object struck would produce breakage of the plate or such end extensions.

Official replacement of the plate is a requisite and the accident wherein the automobile had been involved would therefore be made known and require explanation. Failure to report an accident or running away from the scene of one would not result in avoiding detection as is now so frequently the case. Knowledge on the part of the driver that the vehicle would carry with it evidence of the fact that it had been involved in an accident would normally provide the necessary deterrent to sneaking away from an accident.

Figure 1:
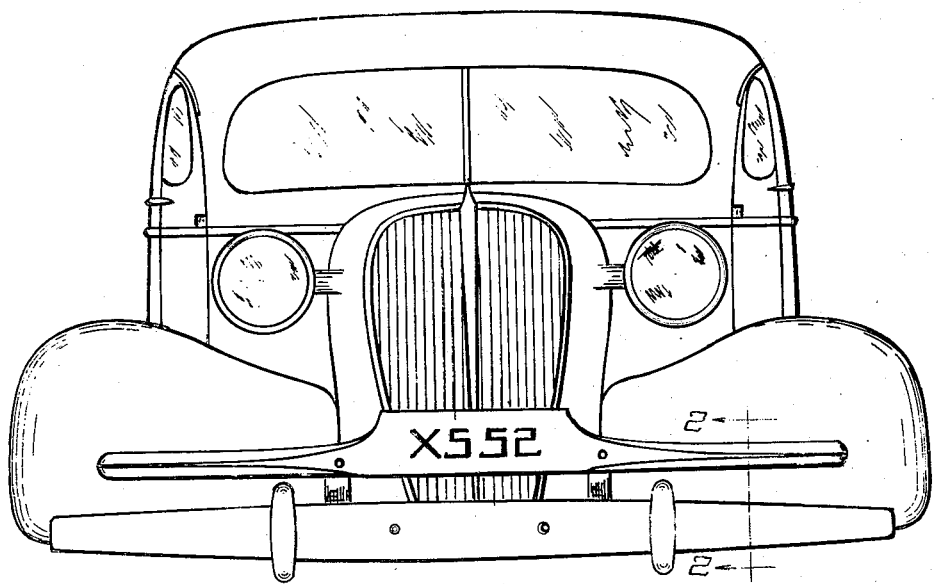
Figure 3:
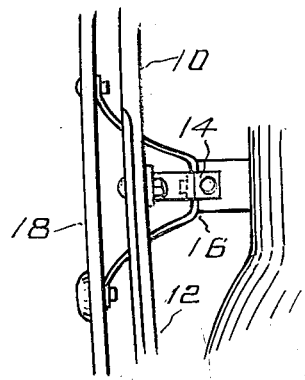
Figure 2:
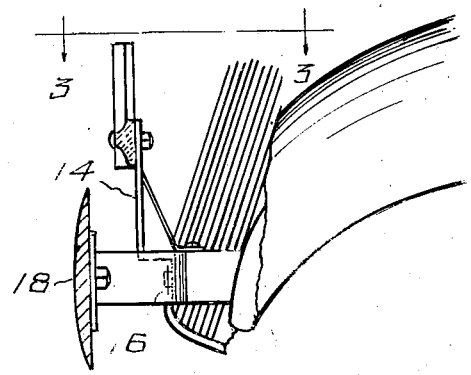
Figure 5:
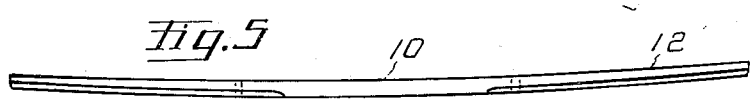
Figure 4:
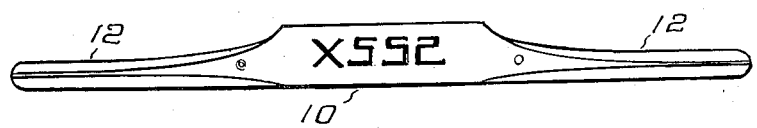

The above and other objects, advantages and meritorious features of my improved invention will more fully appear from the following description, appended claims, and accompanying drawing, wherein:

Figure 1 is a front elevation of a motor vehicle equipped with my improved license plate structure, Fig. 2 is a sectional view taken on 2—2 of Fig. 1, Fig. 3 is a view taken on the line 3—3 of Fig. 2 looking down on the structure, Fig. 4 is a front elevation of the license plate structure per se, and Fig. 5 is a plan of the license plate structure per se.

My improved license plate structure is built in the form of a bar which preferably has a length equal to the tread dimension of the vehicle so that when supported as shown it extends to overlap the wheel fenders. As illustrated, this bar has a central portion 10 and end portions 12. These end portions may be of reduced width as shown in certain figures of the drawing or they might be of the full width of the central portion. This is merely a matter of choice.

This bar is formed of a frangible composition material such as bakelite, hard rubber, glass or certain plastic or composition compounds. The material is of such a character that when the bar is supported as shown it is sufficiently strong to withstand ordinary travel over the road but an impact such as would be produced due to collision of the front end of the vehicle with another object and the striking of the bar against such object would result in breakage of the bar. Such breakage would occur even if the impact were against a relatively soft object such as a human body.

The license plate structure is here shown as constituting an integral piece. The central portion of the bar bears the official license plate number. The end portions are integral therewith. The entire structure is of a frangible brittle nature.

The bar is supported by brackets 14 from the bumper support 16. The bumper 18 is supported in a conventional manner from the chassis frame by the bumper support 16. My improved license plate bar is supported above the bumper spaced slightly rearwardly thereof. It extends transversely so as to overlap the wheel fenders. The first impact of the car would be taken by the bumper and this would meet all ordinary impacts that were not of sufficient force to produce an accident but an impact of sufficient impetus to produce injury would cause the license plate bar to be struck and broken. The injury would be indicated by virtue of the breaking of the license plate structure. Official replacement which would be necessary to enable the operator to continue driving the vehicle would disclose the accident and require explanation and detection would therefore be unavoidable.

What I claim is:

1. In an automobile having wheel fenders and an end bumper, a license plate supported at such end of the automobile between said bumper and fenders extending transversely of the automobile and provided with end extensions overlapping the fenders, said plate and extensions being formed of material relatively easily breakable under impact.

2. An automobile having an end bumper and provided at such end with a transversely extending frangible bar having a length equal to the tread dimension and disposed between the end bumper and the vehicle, said bar including a frangible license plate portion.

3. An automobile having an end bumper and provided at such end with a transversely extending bar having a length equal at least to the tread dimension of the vehicle and disposed between said end bumper and the vehicle, said bar being formed throughout its entire length of material, relatively easily breakable under impact and having its intermediate portion marked to serve as a license plate.

GEORGE A. DUPUIS.